United States Patent
Kunisetty et al.

(10) Patent No.: US 10,219,048 B2
(45) Date of Patent: Feb. 26, 2019

(54) METHOD AND SYSTEM FOR GENERATING REFERENCES TO RELATED VIDEO

(71) Applicant: ARRIS Enterprises, Inc., Suwanee, GA (US)

(72) Inventors: Sridhar Kunisetty, Fremont, CA (US); Sanjeev Mishra, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/302,190

(22) Filed: Jun. 11, 2014

(65) Prior Publication Data

US 2015/0365735 A1    Dec. 17, 2015

(51) Int. Cl.
*H04N 21/8405*    (2011.01)
*H04N 5/445*    (2011.01)
(Continued)

(52) U.S. Cl.
CPC ..... *H04N 21/8405* (2013.01); *H04N 5/44513* (2013.01); *H04N 7/0882* (2013.01);
(Continued)

(58) Field of Classification Search
CPC ............... H04N 21/8405; H04N 7/882; H04N 21/44008; H04N 21/462; H04N 21/4667;
(Continued)

(56) References Cited

U.S. PATENT DOCUMENTS

| | | |
|---|---|---|
| 5,703,655 A | 12/1997 | Corey et al. |
| 7,774,815 B1 | 8/2010 | Allen |

(Continued)

FOREIGN PATENT DOCUMENTS

| | | |
|---|---|---|
| EP | 2048585 A2 | 4/2009 |
| EP | 2385470 A2 | 11/2011 |
| WO | 1069428 A1 | 9/2001 |

OTHER PUBLICATIONS

PCT Invitation to Pay Additional Fees (Form ISA/206), Re: Application No. PCT/US2015/033714; dated Sep. 16, 2015.

(Continued)

*Primary Examiner* — Hai V Tran
*Assistant Examiner* — Susan X Li
(74) *Attorney, Agent, or Firm* — Stewart M. Wiener

(57) ABSTRACT

A method of generating references to related videos is provided. Closed caption text of a primary video is analyzed to identify at least one keyword contained within the closed captioned text and a separate pre-determined listing of keywords. A keyword identified within the closed caption text and a context thereof is compared to keyword-context pairings provided within the listing. Information of a reference video related to the primary video is obtained by taking actions required by a rule in the listing associated with a matched keyword-context pairing when the keyword identified from the primary video and the context thereof is determined to match one of the keyword-context pairings in the listing. An annotation of the reference video relative to the primary video is created. A video processing electronic device and at least one non-transitory computer readable storage medium having computer program instructions stored thereon for performing the method are provided.

20 Claims, 3 Drawing Sheets

(51) Int. Cl.
- *H04N 7/088* (2006.01)
- *H04N 21/488* (2011.01)
- *H04N 21/845* (2011.01)
- *H04N 21/81* (2011.01)
- *H04N 21/231* (2011.01)
- *H04N 21/235* (2011.01)
- *H04N 21/2389* (2011.01)
- *H04N 21/2665* (2011.01)

(52) U.S. Cl.
CPC ... *H04N 21/2353* (2013.01); *H04N 21/23109* (2013.01); *H04N 21/23892* (2013.01); *H04N 21/2665* (2013.01); *H04N 21/4888* (2013.01); *H04N 21/8133* (2013.01); *H04N 21/8455* (2013.01); *H04N 21/8456* (2013.01); *H04N 2005/4453* (2013.01)

(58) Field of Classification Search
CPC .......... H04N 21/4888; H04N 21/8455; H04N 21/8456; H04N 21/44222; H04N 21/8133
See application file for complete search history.

(56) References Cited

U.S. PATENT DOCUMENTS

| | | | |
|---|---|---|---|
| 8,438,595 | B1 | 5/2013 | Kannan |
| 2003/0084037 | A1* | 5/2003 | Kizuka ............ G06F 17/30817 |
| 2003/0088612 | A1* | 5/2003 | Goldschmidt Iki ........................ H04N 5/44543 709/202 |
| 2004/0194141 | A1 | 9/2004 | Sanders |
| 2007/0168864 | A1* | 7/2007 | Yamamoto ........ G06F 17/30265 715/716 |
| 2007/0214488 | A1* | 9/2007 | Nguyen ............ G06F 17/30796 725/134 |
| 2007/0294729 | A1* | 12/2007 | Ramaswamy ......... H04H 60/58 725/53 |
| 2008/0304806 | A1* | 12/2008 | Lin .................... G06F 17/30787 386/278 |
| 2011/0247042 | A1* | 10/2011 | Mallinson ......... G06F 17/30026 725/86 |
| 2014/0047063 | A1 | 2/2014 | Kunisetty et al. |
| 2014/0047479 | A1 | 2/2014 | Kunisetty et al. |
| 2014/0047488 | A1 | 2/2014 | Kunisetty et al. |
| 2014/0115031 | A1 | 4/2014 | Chanderraju et al. |
| 2014/0115032 | A1 | 4/2014 | Chanderraju et al. |
| 2014/0130092 | A1 | 5/2014 | Kunisetty |
| 2014/0130099 | A1 | 5/2014 | Kunisetty |
| 2015/0169542 | A1* | 6/2015 | Lin .................... H04N 5/44543 725/53 |

OTHER PUBLICATIONS

PCT Search Report & Written Opinion, Re: Application No. PCT/US2015/033714; dated Nov. 23, 2015.
F. Dufaux, Key frame selection to represent a video, Image Processing, 2000, pp. 275-278.
Y. Gao, et al., "Thematic Video Thumbnail Selection", Image Processing, 2009, pp. 4333-4336.
J.L. Lai, et al., "Key frame extraction based on visual attention model", Journal of Visual Communication and Image Representation, 2012, pp. 114-125.
Examination Report under section 18(3), RE: Great Britain Application No. GB1621060.1, dated Dec. 28, 2016.
Official Action, RE: Canadian Application No. 2,951,978, dated Oct. 17, 2017.
Examination Report, RE: Great Britain Application No. GB1621060.1, dated Oct. 17, 2017.
Examination Report, RE; Great Britain Application No. GB1621060.1, dated Apr. 24, 2018.
Examination Report, RE: Great Britain Application No. GB1621060.1, dated Aug. 13, 2018.

* cited by examiner

METHOD AND SYSTEM FOR GENERATING REFERENCES TO RELATED VIDEO

BACKGROUND

Video, audio, and multimedia content and other programming may be distributed over broadband or other networks to end-users or subscribers. In some instances, it may be desirable to provide information concerning other videos, programs, or content that may be related to a primary video program of interest to an end-user.

By way of example, many prime-time television programs are in the nature of reality-based series or the like in which there may be progress or continuation from one episode to the next. Thus, information with respect to related programming may enable an end-user to be more readily directed to related content. Such information may additionally find use in video recommender services, second screen services, and various other services and applications. For example, in a second screen service, a second screen, such as a tablet, smartphone or like device may display information concerning other content that may be related to primary content being displayed on a primary screen, such as a television. For instance, if a sports program is being shown on the primary screen, the secondary screen may display information of player statistics, related games, related programs, high-lights, related advertisements, related merchandise, or any other additional information that may be considered relevant to the viewer of the primary content.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
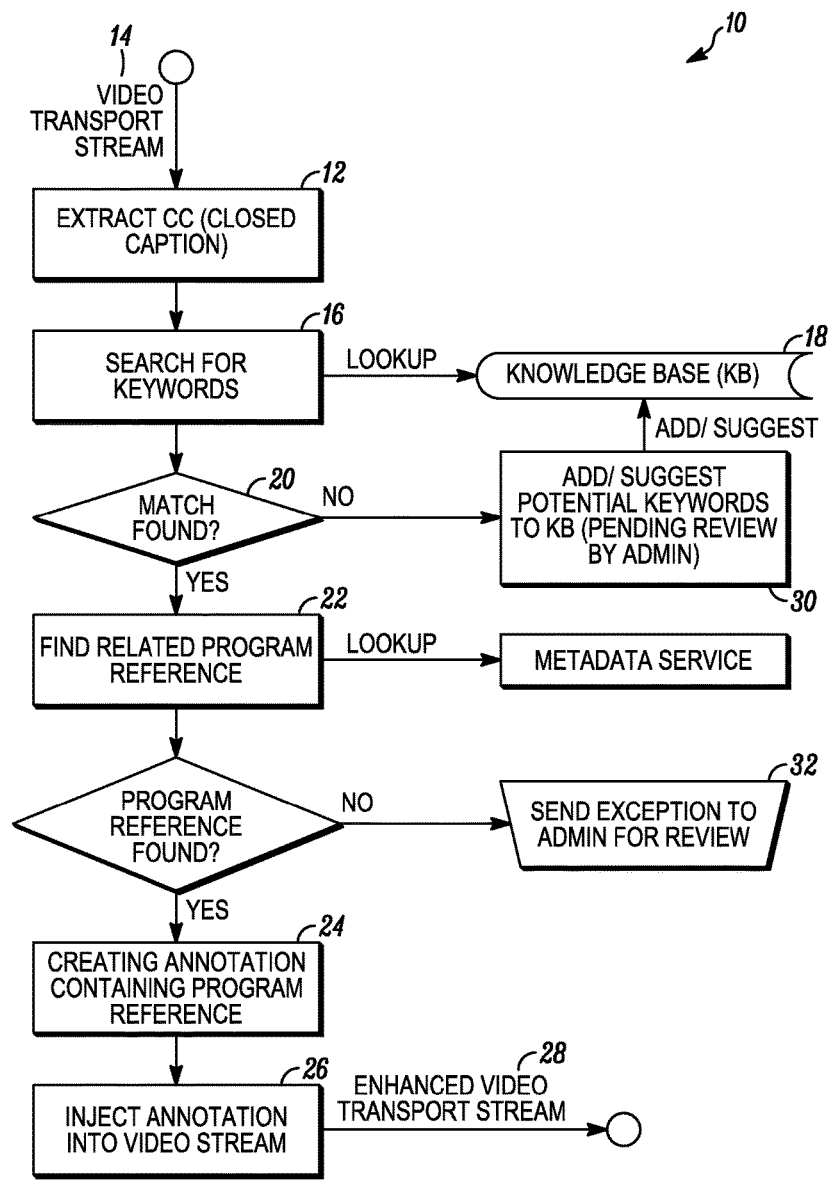
FIG. 1 is a flow diagram representing a process for automatically generating information concerning other program references relative to a primary video program in accordance with an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, suggestions of references, links, information, or the like between a primary video program being consumed or of interest to a viewer and other related video programs are automatically generated by software, hardware, or like device based on the context of words, phrases, or expressions included in closed caption (CC) text information provided with the transport streams of video programs, such as a television or other video programs. Further, since video programs typically include a plurality of segments with definable beginnings and ends, each segment may be analyzed for purposes of automatically generating related video references specifically applicable to the segment. Accordingly, references to other related videos, programs, and content are not limited to being related to the primary program as a whole; rather, according to an embodiment, related videos, programs and content may be associated with a particular segment of a primary video program irrespective of other segments.

The ability to generate and locate information concerning related programs for the segments of a primary video program enables a source of content metadata to be developed and provided from temporal references and content-specific references within the closed captioning of the primary video program that may be used to discover and look-up related content. Thus, according to an embodiment, a so-called "content web" may be automatically generated based on information of video program references provided within each segment of a primary video program.

For purposes of analyzing each segment, keywords, phrases or expressions within the closed caption (CC) text of a segment of a primary video program may be searched. Although information typically provided by closed captioning text may not provide a direct or express indication to a related video reference, such information may be capable of being generated based on contextual use of keywords.

By way of example, the following CC text may be provided for a two minute segment of a video program, [23:00-25:00 min segment] [Episode#2 of the TV series "Take Me Out". ContentID=EP015523220002]:

" . . . NOW, LAST WEEK, JOHN AND SAMANTHA FELL FOR EACH OTHER AND HEADED OFF FOR A DATE . . . . "

In this example of closed captioning text, there is no express reference to a related video program. Thus, merely searching the text for references to related videos would be unsuccessful. However, the words "last week" appearing in the above example of closed captioning text may be considered relative to the contextual use thereof and thereby may enable a related video program to be identified. For instance, the context of the phrase "last week", considering that the primary video program is a reality-based TV series, may provide an indication of a reference to the previous episode (that aired "last week"). Accordingly, although the closed captioning text may not directly or expressly identify or refer to a previous episode or other video program, the context of the keyword or phrase "last week" may be interpreted to derive a corresponding related video reference, namely a reference to the previous episode for this example.

FIG. 1 provides a flow diagram of a method 10 according to an embodiment for automatically generating information of related video program references for a primary video program. Closed captioning text is extracted in step 12 from a source video transport stream 14 of the primary video program. For each segment of the primary video program, a search 16 of the closed captioning text is performed for a set of pre-selected and pre-developed keywords. These keywords are specifically selected as words, phrases and expressions that may be likely to infer a reference to another video. As used herein, the term keyword refers to a single word, a phrase, multiple words in sequence, or an expression and is not limited to single words. For this purpose, words and/or phrases in the closed captioning text of the segment are compared to the listing of pre-selected keywords, also referred to herein as a Knowledge Base (KB) 18.

Exemplary content of a Knowledge Base (KB) 18 may be as provided below in Table 1. This listing may be in the form of a stored database of information which is used during the searching step 16 discussed above and may be subject to addition and revision over time to enable expansion, refinement, and building of the database of knowledge. As shown in Table 1, keywords are listed in the first column and each keyword is associated with a pre-defined context provided in the second column. Each keyword-context pairing (i.e., entries in the first and second columns of each row of Table 1) is further associated with a rule or action provided in the third column of Table 1.

TABLE 1

| KEYWORD | CONTEXT | ACTION |
|---|---|---|
| last episode | type = series & genre = reality | Get_Previous_Episode |
| previous episode | type = series & genre = reality | Get_Previous_Episode |
| last week | series_name = Take Me Out | Get_Previous_Episode |
| last recipe | type = series & genre = cooking | Get_Previous_Episode |
| beginning dance | series_name = Dancing with the Stars | Get_First_Episode_OfThatSeason |
| in Vegas | series_name = America's Got Talent | Get_First_Elimination_Round_Episode |
| in Vegas | series_name = So You Think You Can Dance | Get_Top20_Perform_Episode |
| second week | type = series & genre = reality | Get the $2^{nd}$ episode in that season for that series. |
| third song | series_name = American Idol | Get the $3^{rd}$ episode in that season. |
| next week | type = series & genre = reality | Get_Next_Episode |

In step 20, the closed caption text and information of the primary video program is analyzed and compared to the keywords and context pairings listed in the knowledge base (KR) 18 to determine whether or not there may be a match. For example, if the keyword or phrase "last episode" is located in the closed caption text of the primary video program and the type of the primary video program is a "series" and the genre of the primary video program is "reality", then the corresponding action, or rule, is applied (see first row of Table 1). Information concerning the type, genre, or series name of the primary reference should be readily available from a Metadata Service, such as Electronic Programming Guide (EPG). Thus, if the "last episode" keyword and context pairing are matched, the action or rule determines that the previous episode of the primary video program is a reference video program related to the particular segment of the primary video program being analyzed. Based on historical data, the "matching" can be further fine-tuned at a program/series level. For example, the name of the TV series may be included in the context ($2^{nd}$ column of Table 1) to be more specific for the episodes of that series.

Following a match to a keyword-context pairing determined in step 20, a Metadata Service, such as an EPG Metadata Service, may be used to obtain the related video program, information thereof, and/or its corresponding metadata in step 22. If this information is found, an annotation containing a reference to the related video program is created in step 24. In FIG. 1, the created annotation may be injected or inserted into the source video transport stream 14 in step 26 to create a modified or enhanced video transport stream 28 having information of related references tied to specific segments within the primary video program. As another option, the annotation and/or reference to a related video reference may be stored externally (i.e., external relative to the video transport stream) to create a database concerning related videos which may be made available for searching or used for other purposes, such as for making a recommendation of related videos to a subscriber.

The step 26 of inserting or injecting an annotation of a related video reference into a transport stream may be accomplished in various manners. As an example, the annotation may be inserted into the closed caption text of the segment of the primary video program from which it was generated. According to an embodiment, the annotation may be inserted in the form of a "hidden" annotation which is not displayed when the regular closed caption text is displayed. Hidden annotations may be read by an Application (App), a downstream player/codec, or the like that can read and interpret the hidden marker, has access to the video stream, and may utilize or present the information to a viewer in various manners.

For purposes of example, the closed caption text of the source video transport stream may be modified to provide a hidden annotation at the end of the original closed caption text. The following provides an example (the annotation being added at the end of the text):

" . . . NOW, LAST WEEK, JOHN AND SAMANTHA FELL FOR EACH OTHER AND HEADED OFF FOR A DATE . . . [##REF## ContentId: EP015523220002; Episode:1; Title: Take Me Out]"

Alternatively, the annotation may be inserted into the "user data" field present in MPEG transport streams. After step 26 in FIG. 1, the inserted annotations become a part of the video transport video stream 28 of the primary video program.

The knowledge base (KB) 18 contains the listing of keywords and corresponding inferences and rules. This listing may be created, updated, built-up, expanded, revised and refined by automatic and/or manual methods or a combination thereof. For instance, a potential keyword/context/rule combination may be added or suggested for further review based on the analysis of the closed caption text if a match is not found during step 20 of FIG. 1. See step 30. An admin user interface console or the like may allow an assigned administrator to accept or reject the additions or suggestions of additions to the knowledge base (KB) 18. In a similar manner, the admin user interface console or the like may allow an administrator to accept or reject the automatic annotations suggested for insertion in the video transport stream 28. This allows manual control or override with respect to the automatically generated annotations. The administrator may also be sent a notice in step 32 if information concerning the reference video program could not be located in a Metadata Service or the like.

Figure 2:
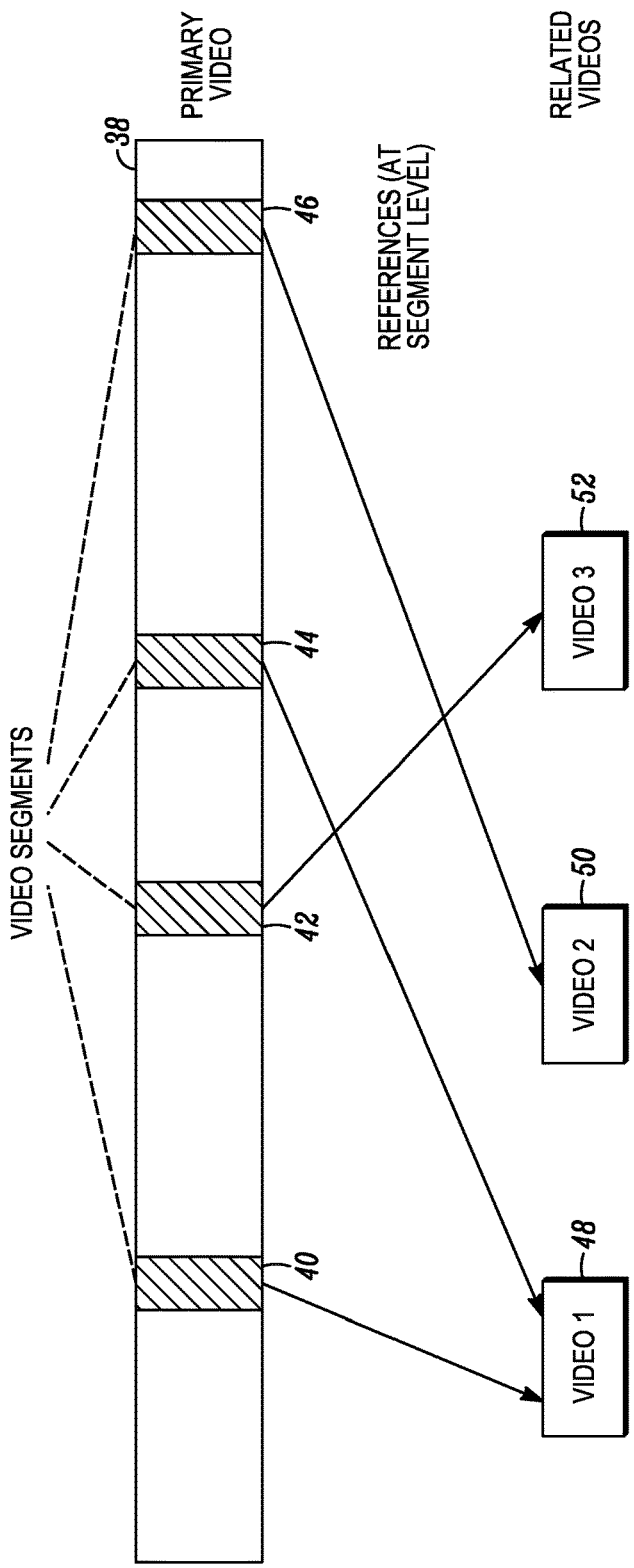
FIG. 2 is a diagram representing a transport stream of a primary video program having references to related video programs in accordance with an embodiment.

FIG. 2 provides an example of a video transport stream 38 that has been subject to the above method and includes annotations to related video references. For example, four different segments 40, 42, 44 and 46 of the transport stream 38 are shown along a timeline of the stream. In the illustrated example, segments 40 and 44 each includes an annotation to a first reference video program 48, segment 42 includes an annotation to a third reference video program 52, and segment 46 includes an annotation to a second reference video 50. Thus, according to an embodiment, the references to the related video programs are provided at the segment level of the primary video program and not merely to the primary video program as a whole.

Figure 3:
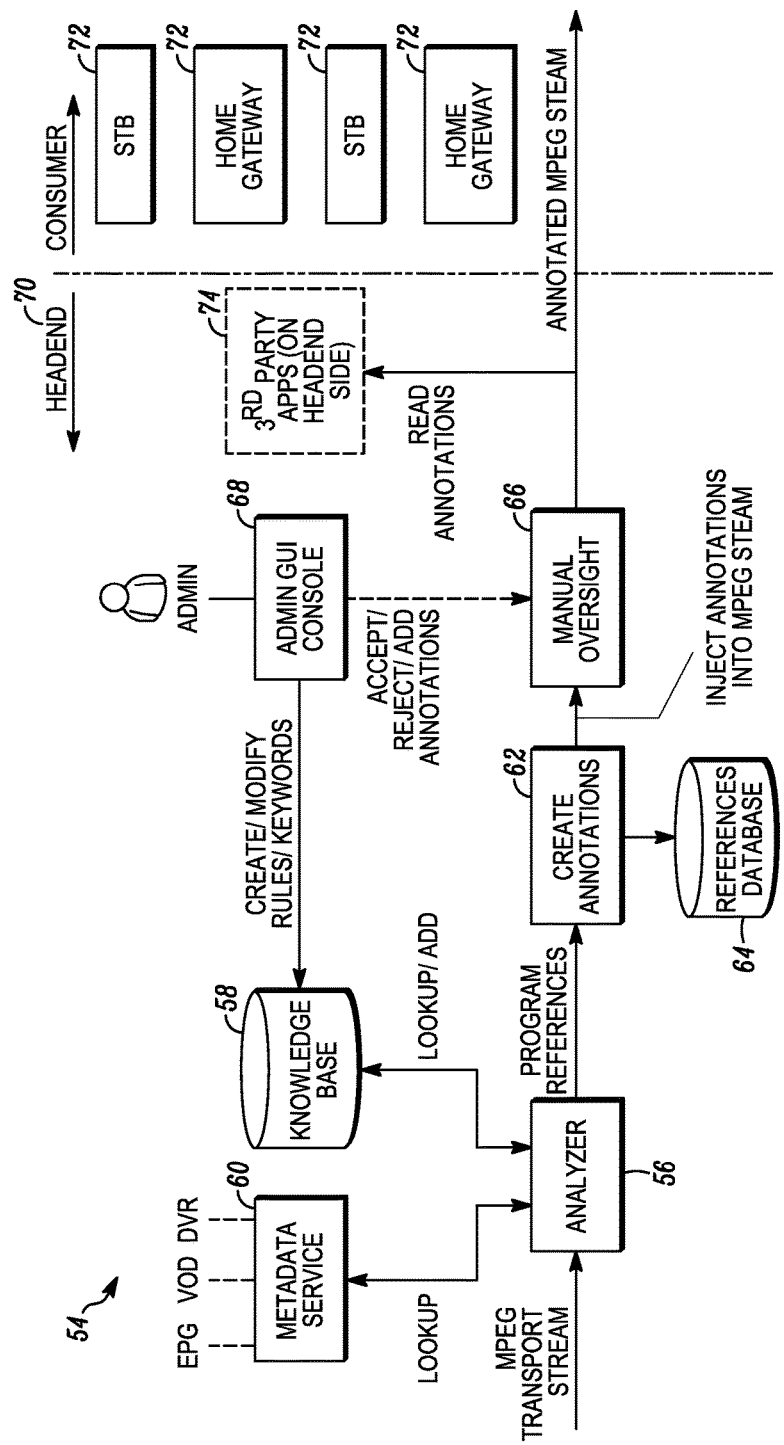
FIG. 3 is a diagram representing a system for automatically generating related program references for a primary video program in accordance with an embodiment.

FIG. 3 provides an example of a system 54 by which the above described method may be implemented. An analyzing unit or analyzer 56 provides the CC text extracting, searching, comparing, and reference program information obtaining steps described above in relation to FIG. 1. For this purpose, the analyzer 56 is in communication with a database 58 of the knowledge base (KB) discussed above so that matches to keyword-context pairings can be determined and an action or rule can be implemented following the determination of a match. The analyzer 56 is also in communication with a Metadata Service 60 so that information concerning related video references may be accessed such as by electronic program guides (EPG), video-on-demand (VOD) services, digital video recorders (DVR), and other sources or providers of information or content.

The analyzer 56 further communicates with a unit or module 62 for creating annotations. The analyzer 56 determines the related video references for a segment of a primary video, obtains information concerning same, and forwards this information to the annotation creation unit 62 which creates annotations and may also store information concerning the relation of segments of video with other related video references in a database 64. The database 64 may be used to provide various services relating to recommending related videos, searching for related videos, and the like.

The annotation creation unit 62 may insert the annotations to related video references into an MPEG transport stream at the segment level of a primary video program. Alternatively, a unit or module 66 may enable manual oversight of the annotation insertion procedure. For instance, an administrator user interface console 68 may permit an administrator to accept, reject or add annotations before annotation insertion by oversight unit 66. The administrator user interface console 68 may also provide the function of creating, modifying, and accepting keyword entries, context entries, rule entries, and combinations thereof for the database 58 of the knowledge base (KB).

As shown in FIG. 3, the units, modules, databases, consoles and the like discussed above may be located at the headend 70 of a network. Alternatively, some of these components or data may be located on servers or the like that may not be physically located at the headend but which are accessible by the headend 70. Accordingly, the annotated MPEG transport stream may be transmitted from the headend 70 to set top boxes, home gateways, and like consumer equipment 72 for consumption by an end-user. In addition, the annotations may be read from the annotated MPEG video transport stream with the use of Applications 74 adapted to provide desired services by third parties or the like.

The above described method and system may be used, for instance, as part of providing a second screen service. As discussed above, a second screen service may be made available to subscribers so that primary content may be displayed on a primary screen while corresponding information concerning other content that is related to the primary content is simultaneously displayed on a second screen. For purposes of example, the primary screen may be provided by a television and the second screen may be provided by a tablet, smartphone, lap-top computer, or like device.

For instance, a second screen service may include a related content generation unit having an analyzer as discussed above with respect to FIG. 3 which communicates with a knowledge base. Closed caption text may be extracted from source video transport streams and made available to the analyzer. Related content or information thereof may be obtained via external sources and stored within the video transport stream or separate of the video transport stream. This information may be provided to a second screen feeds service module which may store the various feeds in a database and display the related content to the end user on the second screen while the primary video may be played on the primary screen. In this manner, a parallel feed service can be created and prepared for transmission to subscribers.

As an alternative or in addition to providing a second screen service, the information and annotation data generated of related content may be used in other manners. For example, the information and annotation data may be used for purposes of providing a related video recommender service for use in recommending related videos to end-users such as in connection with online video markets. The information may also be made available to subscribers in the form of a searchable database. Another alternative is to permit searching of transport video streams by Applications (Apps) or the like on annotated hidden content provided by closed captioning information contained within video transport streams.

With respect to searching for video programs, the number of times a video program is identified or referenced during a search of video transport streams as discussed above, databases of videos and/or related videos as discussed above, or any other searchable electronically-stored information concerning video programs, is determined as part of the search or as part of reviewing search results. Thereafter, the information concerning the number of times each video program is referenced during the course of a search is used and considered when the video programs are ranked, for instance, with respect to popularity, relevance, or the like. Accordingly, a video program which is referenced a greater number of times as the result of a search may be given a ranking of greater significance relative to a video program that is referenced a lower number of times during the search.

For purposes of example, a search of the annotations of the primary video shown in FIG. 2 would identify the related video program 48 ("VIDEO 1") as having two in-coming references (i.e., the VIDEO 1 is referenced by two different segments of the primary video shown in FIG. 2) and the related video programs 50 and 52 ("VIDEO 2" and "VIDEO 3") as each having only one in-coming reference (i.e., the VIDEOs 2 and 3 each being referenced by only segment of the primary video shown in FIG. 2). Thus, when ranked, consideration may be given to the number of in-coming references such that VIDEO 1 may be ranked of greater relevance, significance or popularity than each of VIDEOs 2 and 3.

Accordingly, a method of searching for video programs may include the steps of searching information such as annotations of reference videos relative to at least one primary video, ranking popularity of the reference videos based on a total number of annotations or references to each of the video identified in the search, and providing search results such that a reference video having a greatest total number of annotations or references is indicated as being of greatest popularity. Of course, such a search is not limited to annotations and could be made of any data concerning video programs. In addition, the number of in-coming references to a video program may be taken into consideration in conjunction with other factors when developing a ranking.

Regardless of end use, the embodiments disclosed above enable and automate the generation of related video programs relative to a primary video program and connects the relation of the related video programs directly to a segment within the primary video program. For this purpose, closed caption text of a segment of a primary video is analyzed to identify at least one keyword contained within a separate listing (i.e., knowledge base) of keywords, and the keyword identified within the closed caption text of the primary video and a context thereof is compared to keyword-context pairings provided within the listing (i.e. knowledge base). When the keyword identified from the primary video and the context thereof is determined to match one of the keyword-context pairings in the listing, information of a reference video related to the primary video is obtained by automatically following the actions required by a rule in the listing associated with the matched keyword-context pairing. As a result, an annotation to the reference video may be created. This process may be performed by software, processors, or other electronic equipment without manual oversight. Alternatively, a degree of manual oversight may be provided.

Various modifications can be made to the above referenced embodiments. For example, while the context information in the knowledge base may refer to the type, genre and name of the primary video, these are merely provided as examples and any information obtainable from the transport stream or related metadata could be utilized. Further, while the rules or actions in the knowledge base may direct a reference to an earlier or previous episode of the same content, the rules or actions may direct reference to other series and types of content. Still further, entries in the knowledge base may be updated, accepted, suggested, etc. in any manner and is not limited to the automated process discussed above.

According to an embodiment, at least one non-transitory computer readable storage medium having computer program instructions stored thereon that, when executed by at least one processor, can cause the at least one processor to automatically generate related video references as described in the above embodiments.

The above referenced system, apparatus, units, modules, consoles and the like may include various processors, microprocessors, controllers, chips, disk drives, and like electronic components, equipment, resources, servers, and the like for carrying out the above methods and may physically be provided on a circuit board or within another electronic device. It will be apparent to one of ordinary skill in the art that the processors, controllers, modules, units, and other components may be implemented as electronic components, software, hardware or a combination of hardware and software.

In the foregoing specification, specific embodiments have been described. However, one of ordinary skill in the art appreciates that various modifications and changes can be made without departing from the scope of the embodiments as set forth in the claims below. Accordingly, the specification and figures are to be regarded in an illustrative rather than a restrictive sense, and all such modifications are intended to be included within the scope of the embodiments.

We claim:

1. A method of generating references to related videos, comprising the steps of:

comparing a keyword-context pair for a primary video to a plurality of keyword-context pairings, wherein:
the keyword-context pair for the primary video comprises: a keyword comprising one or more words identified within closed caption text of the primary video, and a context of the keyword, the context comprising program metadata of the primary video,
the plurality of keyword-context pairings is provided in a knowledge base that is a stored database separate from the primary video, the knowledge base comprising:
a pre-determined listing of a plurality of known keywords, each keyword comprising no express identification of, and no direct reference to, another video,
a plurality of known contexts, and
a plurality of pre-determined rules,
the plurality of keyword-context pairings stored in the knowledge base pairs each one of the known keywords with one or more of the known contexts,
each one of the keyword-context pairings stored in the knowledge base is associated with a corresponding one of the pre-determined rules stored in the knowledge base, and
each one of the pre-determined rules comprises one or more actions that, when performed, identify a reference video from the associated keyword-context pairing, the rules being pre-determined using semantic matching that is based on a contextual meaning of the keyword in the known context of the associated keyword-content pairing, to deduce a reference to another video;

based on the comparing, determining a match of the keyword-context pair with a matching one of the keyword-context pairings in the listing, wherein the keyword-context pair comprises: the keyword identified from the primary video, and the context of the keyword;

taking the one or more actions specified by the rule in the listing associated with the matching one of the keyword-context pairings in the listing;

obtaining, from a result of the one or more actions, information identifying a reference video related to the primary video; and creating an annotation comprising program metadata of the reference video related to the primary video.

2. The method according to claim 1, wherein said primary video includes a plurality of segments, and wherein said comparing, obtaining, and creating steps are repeated for each of the plurality of separate segments of the primary video so that each annotation is associated with one of the segments of the primary video.

3. The method according to claim 1, further comprising the step of inserting the annotation of the reference video related to the primary video into a video transport stream of the primary video to provide a modified video transport stream of the primary video containing related video references information.

4. The method according to claim 3, wherein said primary video includes a plurality of segments, and wherein each annotation of reference video related to primary video is inserted into the video transport stream in direct correspondence with one of the segments.

5. The method according to claim 3, wherein said inserting step is selected from the group of steps consisting of inserting the annotation of the reference video related to the primary video in the closed caption text, inserting the annotation of the reference video related to the primary video as a hidden annotation in the closed caption text, and inserting the annotation of the reference video related to the primary video in a user data field of the video transport stream of the primary video.

6. The method according to claim 1, further comprising a step of analyzing closed caption text of the primary video to identify at least one keyword contained within the closed captioned text and the separate pre-determined listing of keywords, wherein the analyzing step includes the steps of extracting the closed caption text of the primary video from a video transport stream of the primary video and searching for the keywords in the closed caption text extracted during said extracting step.

7. The method according to claim 1, wherein said obtaining step includes accessing a metadata service to locate information of the reference video based on the rule in the listing associated with the matched keyword-context pairing.

8. The method according to claim 1, wherein the listing of keywords is expandable and revisable, and wherein the context of the keyword identified includes contextual information of at least one of a type, genre, content identification, and name of the primary video.

9. The method according to claim 1, wherein the rules within the listing include an action of obtaining information of related content including at least one of a previous episode and an earlier identified episode corresponding to the primary video.

10. The method according to claim 1, further comprising the step of providing information of the reference video in a secondary screen with the primary video so that both the primary video and information of the reference video are simultaneously displayed.

11. The method according to claim 1, further comprising the steps of providing the information of the reference video related to the primary content as a recommendation for related video content.

12. The method according to claim 1, further comprising the step of storing the annotation of the reference video related to the primary video in a database.

13. The method according to claim 1, further comprising the steps of:
ranking popularity of reference videos based on a total number of annotations to each of the reference videos within at least the primary video; and
providing search results such that a reference video having a greater number of annotations is indicated as being of greater relevance that a reference video having a lower number of annotations.

14. A video processing system for automatically generating references to related videos, comprising at least one processing unit configured to:
compare a keyword-context pair for a primary video to a plurality of keyword-context pairings, wherein:
the keyword-context pair for the primary video comprises: a keyword comprising one or more words identified within closed caption text of the primary video, and a context of the keyword, the context comprising program metadata of the primary video,
the plurality of keyword-context pairings is provided in a knowledge base that is a stored database separate from the primary video, the knowledge base comprising:
a pre-determined listing of a plurality of known keywords, each keyword comprising no express identification of, and no direct reference to, another video,
a plurality of known contexts, and
a plurality of pre-determined rules,
the plurality of keyword-context pairings stored in the knowledge base pairs each one of the known keywords with one or more of the known contexts,
each one of the keyword-context pairings stored in the knowledge base is associated with a corresponding one of the pre-determined rules stored in the knowledge base, and
each one of the pre-determined rules comprises one or more actions that, when performed, identify a reference video from the associated keyword-context pairing, the rules being pre-determined using semantic matching that is based on a contextual meaning of the keyword in the known context of the associated keyword-content pairing, to deduce a reference to another video;
based on the comparing, determine a match of the keyword-context pair with a matching one of the keyword-context pairings in the listing, wherein the keyword-context pair comprises: the keyword identified from the primary video, and the context of the keyword;
take the one or more actions specified by the rule in the listing associated with the matching one of the keyword-context pairings in the listing;
obtain, from a result of the one or more actions, information identifying a reference video related to the primary video; and
create an annotation comprising program metadata of the reference video related to the primary video.

15. The video processing system according to claim 14, wherein the primary video includes a plurality of segments, and wherein said at least one processing unit is configured to compare the keyword identified and the context of the keyword with the keyword-context pairings, obtain the information of the reference video, and create the annotation of the reference video for each of the plurality of segments of the primary video so that each annotation is associated with one of the segments of the primary video.

16. The video processing system according to claim 14, wherein said at least one processing unit is configured to insert the annotation to the reference video related to the primary video into a video transport stream of the primary video to provide a modified video transport stream of the primary video containing related video references information.

17. The video processing system according to claim 14, wherein said at least one processing unit is configured to provide the information of the reference video in a second screen feed with the primary video so that both the primary video and the information of the reference video are displayable at the same time.

18. At least one non-transitory computer readable storage medium having computer program instructions stored thereon that, when executed by at least one processor, cause the at least one processor to automatically generate references for a primary video to related videos by performing the following operations:

compare a keyword-context pair for the primary video to a plurality of keyword-context pairings, wherein:

the keyword-context pair for the primary video comprises: a keyword comprising one or more words identified within closed caption text of the primary video, and a context of the keyword, the context comprising program metadata of the primary video, the plurality of keyword-context pairings is provided in a knowledge base that is a stored database separate from the primary video, the knowledge base comprising:

a pre-determined listing of a plurality of known keywords, each keyword comprising no express identification of, and no direct reference to, another video, a plurality of known contexts, and a plurality of pre-determined rules, the plurality of keyword-context pairings stored in the knowledge base pairs each one of the known keywords with one or more of the known contexts, each one of the keyword-context pairings stored in the knowledge base is associated with a corresponding one of the pre-determined rules stored in the knowledge base, and each one of the pre-determined rules comprises one or more actions that, when performed, identify a reference video from the associated keyword-context pairing, the rules being pre-determined using semantic matching that is based on a contextual meaning of the keyword in the known context of the associated keyword-content pairing, to deduce a reference to another video;

based on the comparing, determine a match of the keyword-context pair with a matching one of the keyword-context pairings in the listing, wherein the keyword-context pair comprises: the keyword identified from the primary video, and the context of the keyword;

take the one or more actions specified by the rule in the listing associated with the matching one of the keyword-context pairings in the listing;

obtain, from a result of the one or more actions, information identifying a reference video related to the primary video; and create an annotation comprising program metadata of the reference video related to the primary video.

19. The at least one non-transitory computer readable storage medium according to claim 18, wherein the primary video includes a plurality of segments, and wherein the computer program instructions stored thereon, when executed by at least one processor, cause the at least one processor to automatically compare the keyword identified and the context of the keyword with the keyword-context pairings of the listing, obtain the information of the reference video, and create the annotation of the reference video for each of the plurality of segments of the primary video such that each annotation is associated with one of the segments of the primary video.

20. The at least one non-transitory computer readable storage medium according to claim 18, the operations further comprising:

determine a number of times each video program identified during an electronic search for video programs is referenced during the electronic search; and automatically rank the video programs identified in the electronic search such that a video program which is referenced a greater number of times is given a ranking of greater significance relative to a video program that is referenced a lower number of times.

* * * * *